(12) United States Patent
Borthakur (10) Patent No.: US 7,191,225 B1
(45) Date of Patent: Mar. 13, 2007

(54) MECHANISM TO PROVIDE DIRECT MULTI-NODE FILE SYSTEM ACCESS TO FILES ON A SINGLE-NODE STORAGE STACK

(75) Inventor: Dhrubajyoti Borthakur, San Jose, CA (US)

(73) Assignee: Veritas Operating Corporation, Cupertino, CA (US)

( * ) Notice: Subject to any disclaimer, the term of this patent is extended or adjusted under 35 U.S.C. 154(b) by 789 days.

(21) Appl. No.: 10/306,562

(22) Filed: Nov. 27, 2002

(51) Int. Cl.
G06F 15/167 (2006.01)

(52) U.S. Cl. .............. 709/213; 709/214; 709/225; 709/248; 707/8; 707/10; 711/114; 711/147

(58) Field of Classification Search .......... 709/213, 709/214, 217–219, 225, 229, 248; 707/8, 707/10; 711/114, 147, 154
See application file for complete search history.

(56) References Cited

U.S. PATENT DOCUMENTS

| | | | |
|---|---|---|---|
| 5,950,203 A * | 9/1999 | Stakuis et al. .............. 707/10 |
| 6,073,209 A * | 6/2000 | Bergsten .................... 711/114 |
| 6,606,690 B2 * | 8/2003 | Padovano ................... 709/213 |
| 6,718,372 B1 * | 4/2004 | Bober ........................ 709/217 |
| 6,763,423 B2 * | 7/2004 | Stakutis et al. ............ 711/148 |
| 6,834,324 B1 * | 12/2004 | Wood ........................ 711/111 |
| 6,886,035 B2 * | 4/2005 | Wolff ......................... 709/219 |
| 6,944,732 B2 * | 9/2005 | Thunquest et al. ......... 709/213 |
| 7,020,758 B2 * | 3/2006 | Fisk .......................... 711/172 |
| 2004/0064729 A1 * | 4/2004 | Yellepeddy ................. 713/201 |

OTHER PUBLICATIONS

"Network File System Protocol Specification," Sun Microsystems, Inc., pp. 1-27, Mar. 1989.
"IBM Tivoli SANergy Administratior's Guide," International Business Machines Corporation, pp. 1-106, Oct. 2002.

* cited by examiner

*Primary Examiner*—Philip B. Tran
(74) *Attorney, Agent, or Firm*—Meyertons Hood Kivlin Kowert & Goetzel, P.C.; B. Noël Kivlin (57) ABSTRACT

A method and system for providing multi-node file system access to files on a single-node storage stack. The method may include sending a data access request from a client system to a server system over a network. The data access request may comprise a request to access data which is stored on one or more storage devices whose access is controlled by the server system. The method may include using a mapping interface to determine a quantity of components in the storage stack. The method may further include using the mapping interface to communicate with the storage stack components to retrieve a physical location of the data on the storage devices and sending the physical location of the data to the client. The method may include the client bypassing the server to access the data on the storage devices at the physical location provided by the mapping interface.

20 Claims, 5 Drawing Sheets

MECHANISM TO PROVIDE DIRECT MULTI-NODE FILE SYSTEM ACCESS TO FILES ON A SINGLE-NODE STORAGE STACK

BACKGROUND OF THE INVENTION

1. Field of the Invention

This invention is related to the field of storage management and, more particularly, to software used in storage management.

2. Description of the Related Art

The Network File System (NFS) is a client/server application that lets a computer user view and optionally store and update files on a remote computer as though the files were on the user's own computer. The user's system needs to have an NFS client and the other computer needs an NFS server. NFS was developed by Sun Microsystems and has been designated a file server standard. The NFS protocol provides transparent remote access to shared files across networks. The NFS protocol is designed to be portable across different machines, operating systems, network architectures, and transport protocols. Implementations of NFS exist for a variety of machines, from personal computers to supercomputers.

NFS defines the way in which files are named and where they are placed logically for storage and retrieval. In NFS, a file is placed in a directory (folder in Windows) or subdirectory at the desired place in the tree structure. NFS also specifies conventions for naming files. These conventions may include one or more of, but are not limited to, the maximum number of characters in a name, which characters can be used, and, in some systems, how long the file name suffix can be. NFS also defines a format for specifying the path to a file through the structure of directories.

Using NFS, the user or a system administrator may mount a portion or all of the files available in the NFS file system. The mounted files may be accessed with whatever privileges are associated with the access to each file (e.g. read-only and read-write). The mounted files are logically organized in a file system. A file system is a tree on a single server with a specified root. NFS assumes a file system that is hierarchical, with directories as all but the bottom level of files. Each entry in a file system (file, directory, device, etc.) has a string name. Different operating systems may have restrictions on the depth of the tree or the names used, as well as using different syntax to represent the "pathname," which is the concatenation of all the "components" (directory and file names) in the name.

A mount point is a position or node in a directory tree on a server at which a file system is mounted. Mount points on a server may be exported to other systems (e.g. servers). When a file system at a mount point on a server is exported to another system, the file system is mounted at a mount point in the importing system.

The NFS protocol uses file handles to uniquely identify files. An NFS server constructs a file handle using the file system identifier (fsid) and the file identifier (fileid) exported by the local file system. The local file system may guarantee that the file system identifier uniquely identifies a file system on that machine, and may guarantee that the file identifier uniquely identifies a file on the specified file system. Thus, the NFS server may guarantee that the file handle uniquely identifies a file on that server. In addition to the file system identifier and file identifier, the file handle may also include export information about the NFS server mount point. NFS supports a lookup procedure for converting file names into file handles.

A MOUNT protocol allows a server to hand out remote access privileges to a restricted set of clients. The mount protocol performs the operating system-specific functions that allow, for example, the attachment of remote directory trees to local file systems. The MOUNT protocol may be used to initiate client access to a server supporting the Network File System (NFS) application. The MOUNT protocol handles local operating system specifics such as path name format and user authentication. Clients desiring access to the NFS program may use the MOUNT protocol to obtain a file handle suitable for use with NFS.

Clustering may be defined as the use of multiple computers, for example PCs or UNIX workstations, multiple storage devices, and redundant interconnections, to form what appears to users as a single highly available system. Clustering may be used for load balancing, and parallel processing as well as for high availability. To the outside world, the cluster appears to be a single system. A cluster may be defined as a group of servers and other resources that act like a single system and enable high availability and, in some cases, load balancing and parallel processing.

A common use of clustering is to load balance traffic on high-traffic Web sites. A Web page request is sent to a "manager" server, which then determines which of several identical or similar Web servers to forward the request to for handling. Having a Web farm (as such a configuration is sometimes called) allows traffic to be handled more quickly.

The storage area network (SAN) model places storage on its own dedicated network, removing data storage from the main user network. This dedicated network most commonly uses Fibre Channel technology, a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fibre Channel switching technology to a wide range of servers and storage devices.

The versatility of the SAN model enables organizations to perform tasks that were previously difficult to implement, such as LAN-free and server-free tape backup, storage leasing, and full-motion video services. SAN deployment promises numerous advantages, including cost management through storage consolidation, higher availability of data, better performance and seamless management of online and offline data. In addition, the LAN is relieved of the overhead of disk access and tape backup, data availability becomes less server-dependent, and downtime incurred by service and maintenance tasks affects more granular portions of the available storage system.

One of the primary goals of a file system is to reduce the latency associated with accessing data. Generally speaking, latency is the period of time that one component in a system spends waiting for another component. For example, in accessing data on a disk, latency includes the time it takes to position the proper sector under the read/write head. In networking, latency includes the amount of time it takes a packet to travel from source to destination. If one considers a human to be a component of a system, then latency measures the amount of time a human wastes waiting for a result. Users will increasingly obtain their desired product or service from sources providing the lowest latency. With that in mind, a file system often aims to reduce the time that people (as well as other elements of the system) spend waiting for data.

Traditional file systems are single-node file systems. In a single-node file system, a single-node storage stack (including, for example, volume management software) resides on each node and allows each respective node to manage data stored in storage devices accessible from that node. In a shared storage environment such as a SAN, multiple networked nodes may access a storage device managed by a particular node running a single-node file system. However, to access a file on the shared storage device, another node must typically use a network file protocol such as NFS. The node that manages the storage may be able to access the file directly, but the other node typically can access the file only indirectly. The indirection caused by the use of NFS may contribute undesirably to latency.

Enterprise Storage Management Application (ESMA) developers are usually expected to support a large variety of SAN storage stack components (both hardware and software) when writing portable, enterprise-class data management applications. However, dozens of file systems may each feature their own proprietary sets of metadata about their underlying data objects. File systems and volume managers may rearrange physical location of data at unpredictable times, thus rendering snapshot images inconsistent with the actual block locations. Each component of the storage stack may employ a unique method of caching/flushing data buffers, thus making it difficult to ensure synchronization among data objects. Logical volumes could be created across competing brands of volume managers or storage arrays. The arrays themselves may use different methods of creating snapshots and mirrors. For these reasons and more, it is daunting to expect a generic piece of software to communicate with heterogeneous APIs to determine physical locations of data.

SUMMARY OF THE INVENTION

Various embodiments of a method and system for providing multi-node file system access to files on a single-node storage stack are disclosed. In one embodiment, the method may include sending a data access request from a client system to a server system over a network. The data access request may comprise a request to access data which is stored on one or more storage devices whose access is controlled by the server system. The server system includes a storage stack which comprises components for managing the one or more storage devices. The method may include using a mapping interface to determine a quantity of components in the storage stack. The method may further include using the mapping interface to communicate with the storage stack components to retrieve a physical location of the data on the storage devices and sending the physical location of the data to the client. The method may further include using a mapping interface to retrieve a physical location of the data on the one or more storage devices and sending the physical location of the data to the client system. The method may further include the client system bypassing the server system to access the data on the one or more storage devices at the physical location provided by the mapping interface.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
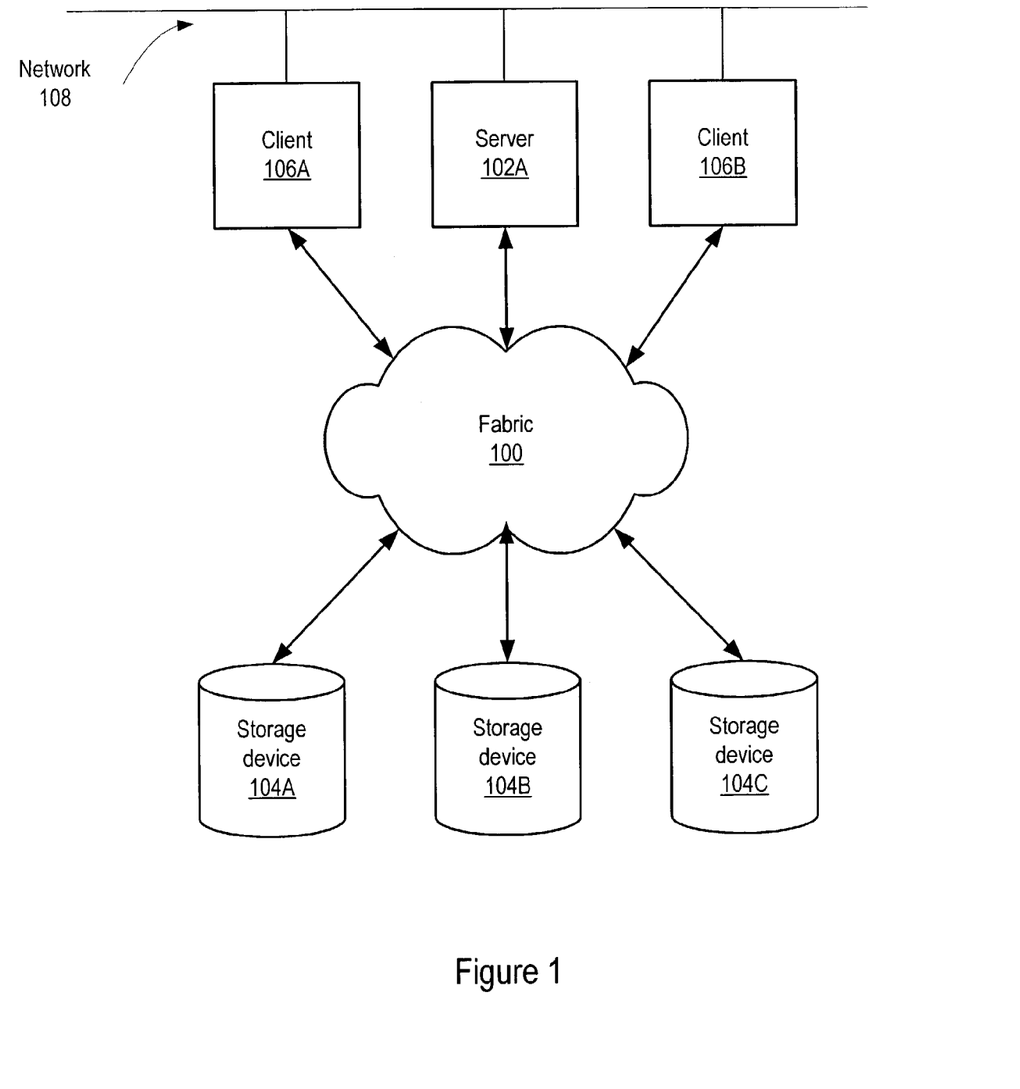
FIG. 1 illustrates an exemplary Storage Area Network (SAN) environment in which embodiments of a mechanism for providing direct multi-node file system access to files on a single-node storage stack may be implemented.

FIG. 1 illustrates an exemplary Storage Area Network (SAN) environment in which embodiments direct multi-node file system access mechanism may be implemented. For one embodiment, SAN may be described as a high-speed, special-purpose network that interconnects one or more storage devices 104 (e.g. storage devices 104A, 104B, and 104C) with one or more associated host systems or servers 102 (e.g. server 102A) on behalf of a larger network of users. This dedicated network may employ Fibre Channel technology. A SAN may be part of the overall network of computing resources for an enterprise or other entity. The one or more servers 102 (e.g. server 102A) and one or more storage devices 104 (e.g. storage devices 104A, 104B, and 104C) may be coupled via a fabric 100. One or more client systems 106 may access the SAN by accessing one or more of the servers 102 via a network 108. The client systems 106 may communicate with the server 102A to access data on the storage devices 104A, 104B, and 104C which are managed by server 102A. The client systems 106 may comprise server systems which manage a different set of storage devices. The client systems 106 may therefore also act as servers and may be coupled to other storage devices (not shown) through the fabric 100.

Network 108 may include wired or wireless communications connections separate from the Fibre Channel network. For example, network 108 is representative of any local area network (LAN) such as an intranet or any wide area network (WAN) such as the Internet. Network 108 may use a variety of wired or wireless connection mediums. For example, wired mediums may include: a modem connected to plain old telephone service (POTS), Ethernet, and fiber channel. Wireless connection mediums include a satellite link, a modem link through a cellular service or a wireless link such as Wi-Fi™, for example.

Storage devices may include any of one or more types of storage devices including, but not limited to, storage systems such as RAID (Redundant Array of Independent Disks) systems, disk arrays, JBODs (Just a Bunch Of Disks, used to refer to disks that are not configured according to RAID), tape devices, and optical storage devices. These devices may be products of any of a number of vendors including, but not limited to, Compaq, EMC, and Hitachi. Servers 102 may run any of a variety of operating systems, including, but not limited to, Solaris 2.6, 7 or 8, Microsoft Windows NT 4.0 (Server and Enterprise Server), and Microsoft Windows 2000 (Server, Advanced Server and Datacenter Editions). Each server 102 may be connected to the fabric 100 via one or more Host Bus Adapters (HBAs).

The hardware that connects servers 102 to storage devices 104 in a SAN may be referred to as a fabric 100. The SAN fabric 100 enables server-to-storage device connectivity through Fibre Channel switching technology. The SAN fabric 100 hardware may include one or more switches (also referred to as fabric switches), bridges, hubs, or other devices such as routers, as well as the interconnecting cables (for Fibre Channel SANs, fibre optic cables). SAN fabric 100 may include one or more distinct device interconnection structures (e.g. Fibre Channel Arbitrated Loops, Fibre Channel Fabrics, etc.) that collectively form the SAN fabric 100.

In one embodiment, a SAN-aware file system may use the Network File System (NFS) protocol in providing access to shared files on the SAN. Using NFS, each server 102 may include a logical hierarchy of files (i.e. a directory tree) physically stored on one or more of storage devices 104 and accessible by the client systems 106 through the server 102. These hierarchies of files, or portions or sub-trees of the hierarchies of files, may be referred to herein as "file systems." In one embodiment, the SAN components may be organized into one or more clusters to provide high availability, load balancing and/or parallel processing. For example, in FIG. 1, server 102A and clients 106A and 106B may be in a cluster.

In traditional storage architecture, each server is privately connected to one or more storage devices using SCSI or other storage interconnect technology. If a server is functioning as a file server, it can give other servers (its clients) on the network access to its locally attached files through the local area network. With a storage area network, storage devices are consolidated on their own high-speed network using a shared SCSI bus and/or a fibre channel switch/hub. A SAN is a logical place to host files that may be shared between multiple systems. This may potentially reduce traffic on the LAN if clients accessing shared files are able to get the data directly from the SAN itself, rather than through the server and over the LAN. Embodiments of a SAN direct access system as described herein make this possible.

A shared storage environment is one in which multiple servers may access the same set of data. A challenge with this architecture is the maintenance of consistency between file data and file system data. A common architecture for sharing file-based storage is the File Server architecture, for example, the SAN environment illustrated in FIG. 1. In the File Server architecture, one or more servers are connected to a large amount of storage (either attached locally or in a SAN) and provide other systems access to this storage. This architecture has a number of limitations for environments with escalating storage or performance requirements:

File-server performance becomes a gating factor because it must manage all requests for file access.

Because all data travels over the LAN, the file server and its network interfaces, the network can become a performance bottleneck. This is particularly true when the files involved—such as graphics, audio or multimedia files—are large or the volume of requests is high, such as a when a Web site experiences traffic peaks.

Web server installations attempt to solve the scalability problem by replicating the data on multiple servers, which introduces storage and management overhead.

This architecture does not leverage all the benefits of the SAN. Although data transfer between the SAN and the file server is fast, all data still travel from storage devices 104 to client systems 106 through a server 102 and over the potentially congested network 108 (e.g. a LAN). As increasing numbers of clients request data, performance may degrade rapidly.

Figure 2:
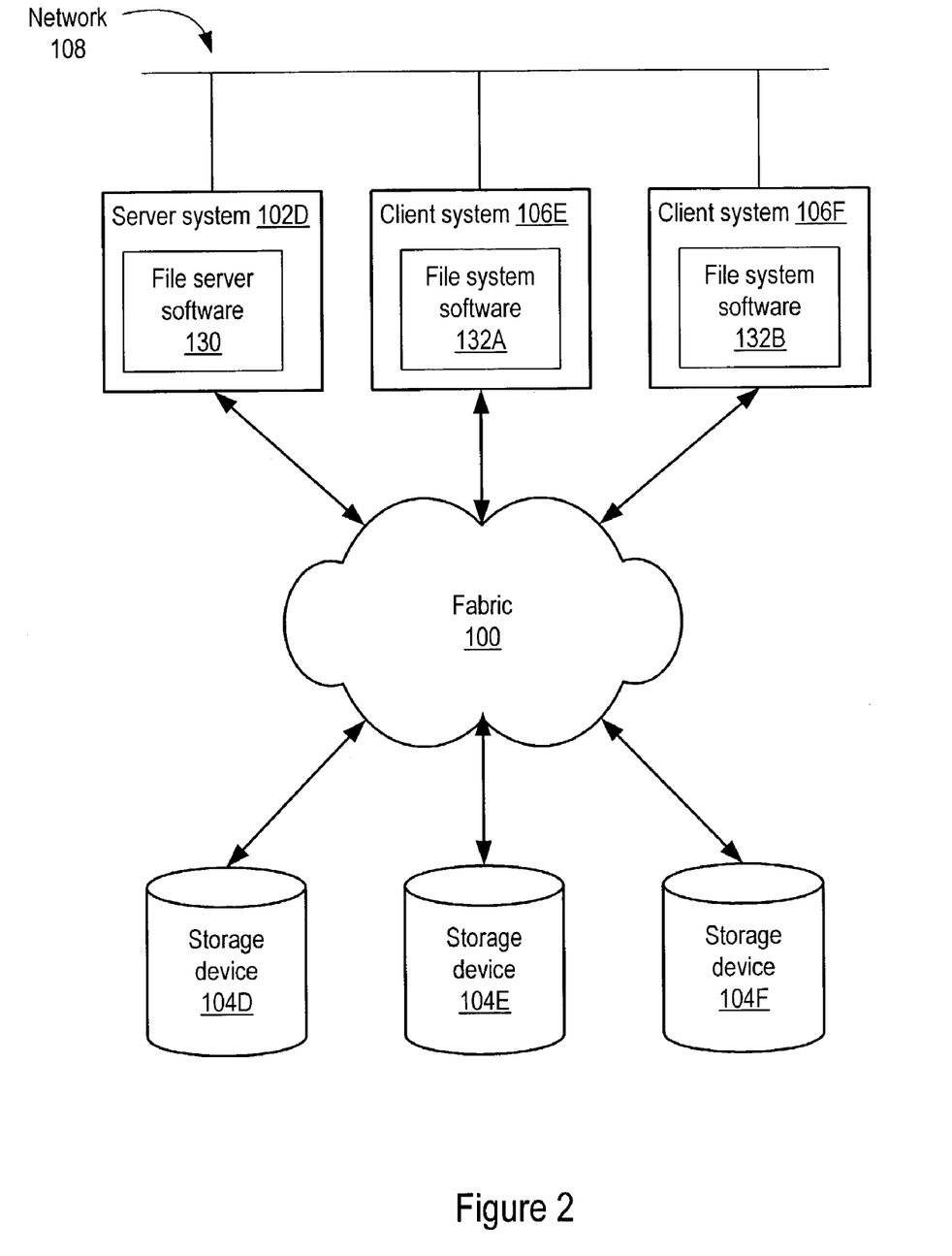
FIG. 2 illustrates an exemplary SAN direct access system in which embodiments of the mechanism for providing direct multi-node file system access to files on a single-node storage stack may be implemented.

FIG. 2 illustrates a SAN direct access system according to one embodiment. Embodiments of the SAN direct access system may provide each client system 106 direct access to the data on storage devices 104 on the SAN. In one embodiment, file server software 130 controls the access to ensure the integrity of the data. This architecture provides enhanced scalability and performance, while operating transparently to the client systems 106 accessing the data. Embodiments of the SAN direct access system may be used with a variety of operating systems, including, but not limited to, Microsoft's Windows 2000 and Windows XP operating systems. In one embodiment, the SAN direct access system may operate transparently to the users and applications accessing the shared data.

One embodiment of the SAN direct access system may include a server module (file server software 130) that may run on at least one server system 102 (e.g., server system 102D) and that may act as a file server for the shared storage devices 104 (e.g., shared storage devices 104D, 104E, and 104F). One embodiment of the SAN direct access system may include one or more file system software client modules 132 (e.g., file system clients 132A and 132B) that may each run on a client system 106 (e.g., client systems 106E and 106F). Client systems 106 may include servers such as Web servers, NFS servers, as well as other systems. One embodiment may include a SAN direct access management console that may run on any server system 102, client system 106, or any other system on the network 108.

The file server software 130 "owns" the shared storage and manages access to the storage, and may appear to clients 106 as a standard file server. As discussed further with reference to FIGS. 4 and 5, file system clients 132 may access the shared storage 104 directly once the file server software 130 has sent the physical location of particular files to the client system 106. This results in less data traveling over the network 108 and the file system clients 132 receiving data at SAN speeds.

In one embodiment, the file server software 130 mounts the shared file system, manages space on the disk and controls access to files using standard Windows access and CIFS protocols. The file server software 130 may access a file using I/O requests to perform file operations on the file. File operations may include, but are not limited to, reading, writing, deleting, renaming, changing file ownership, etc. An I/O request may include the file handle for the file to access and other information for performing the desired operation. For example, a Read I/O request may include the file handle, an offset into the file, a length for the read, and a destination address or buffer of the read.

A file system client 132 may request access to a file managed by the SAN direct access server 130. When the file server software 130 grants access, it sends the physical location (e.g., disk addresses for the blocks). The file system client 132 reads the disk blocks directly over the SAN fabric 100, bypassing the network 108 altogether. Thus, embodiments of the SAN direct access system may provide direct disk access to shared data. In one embodiment, the only traffic that travels over the network 108 between the file server software 130 and the file system client 132 are any messages needed to authenticate and grant access to the files and to provide the disk addresses to the file system client 132—the file system metadata. In one embodiment, the files themselves do not travel on the network 108. In one embodiment, an occasional file access may be made via the file server software 130 across the network 108 to ensure data integrity.

Embodiments of the SAN direct access system may help prevent the network 108 from becoming congested. Embodiments of the file server software 130 may process more client requests than standard file servers because they manage only the metadata instead of serving the data itself. This may reduce the I/O load on the file server software 130 and thus may reduce or eliminate performance bottlenecks at the file server software 130. Using the SAN direct access system, a file system client 132 may access the data at SAN speeds instead of network 108 speeds. Less data travels through the network 108 because the shared files themselves travel directly over the SAN to file system clients 132. Networks implementing the SAN direct access system may handle significantly more requests without adding hardware infrastructure.

Embodiments of the SAN direct access system may be scalable. In one embodiment, a SAN direct access system may include multiple file system clients 132 and file servers 130. In one embodiment, the SAN direct access system supports a multiserver architecture, in which different file servers 130 "own" and serve different shared data pools. Adding file servers 130 may alleviate the server-based load and increase scalability. In one embodiment, additional file system clients 132 may be added. For example, using the SAN direct access system, a Web site may add Web servers to manage more requests. Each added Web server, as a file system client 132, requests the shared data from the file server software 130 and then accesses the data directly from the SAN using direct disk access. Each new file system client 132 may add only minor additional network 108 traffic because only the metadata requests travel on the network.

By supporting consolidated storage on a SAN, embodiments of the SAN direct access system may simplify overall storage management tasks. One embodiment may include a SAN direct access management console that may include a graphical user interface (GUI) for managing shared storage. From the console, a user may, for example, connect to the file server(s) 130, assign storage to file server(s) 130, and create export shares. In one embodiment, the user, from the console, may also connect to file system clients 132 and create import shares to make the shared storage available to the file system clients 132.

One embodiment of the SAN direct access system may also be compatible with failover clustering solutions, such as Microsoft Cluster Server (MSCS). In this embodiment, making a file server 130 a node in a failover cluster may provide a high availability configuration for shared storage access. Additionally, One embodiment of the SAN direct access system may support file servers 130 configured with a Cluster Server in either active/passive or active/active modes. The active/active configuration may allow for load balancing between file servers 130 that are included in the cluster. This may enable high-performance file access in SANs from multiple nodes.

While FIGS. 1 and 2 illustrate typical SAN architectures in which embodiments of the mechanism for providing direct multi-node file system access may be implemented, embodiments may be implemented in other network storage architectures including other SAN architectures.

Figure 3:
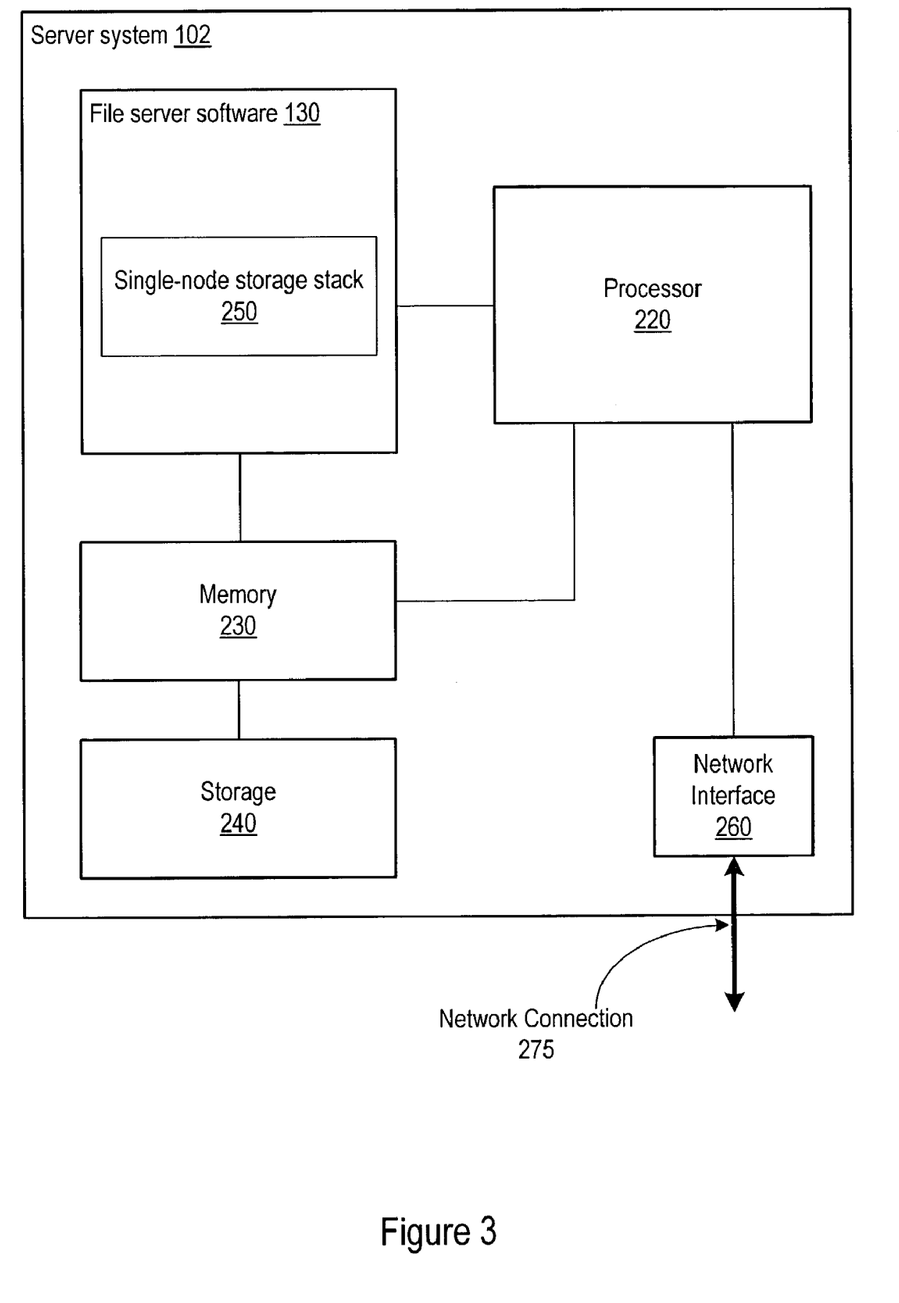
FIG. 3 is a diagram of a server system including a single-node storage stack according to one embodiment.

FIG. 3 is a diagram of an exemplary server system 102 including a single-node storage stack 250 according to one embodiment. Generally speaking, the server system 102 may include various hardware and software components. In the illustrated embodiment, server system 102 includes a processor 220 coupled to a memory 230 which is in turn coupled to storage 240. In addition, processor 220 is coupled to a network interface 260. Server system 102 may be connected to a network such as network 108 via a network connection 275. Further, server system 102 includes a single-node storage stack 250. The file server software 130 is executable by processor 220 out of memory 230. The file server software 130 includes a single-node storage stack 250 which is further described with reference to FIG. 4.

Processor 220 may be configured to execute instructions and to operate on data stored within memory 230. In one embodiment, processor 220 may operate in conjunction with memory 230 in a paged mode, such that frequently used pages of memory may be paged in and out of memory 230 from storage 240 according to conventional techniques. It is noted that processor 220 is representative of any type of processor. For example, in one embodiment, processor 220 may be compatible with the x86 architecture, while in another embodiment processor 220 may be compatible with the SPARC™ family of processors.

Memory 230 is configured to store instructions and data. In one embodiment, memory 230 may be implemented in various forms of random access memory (RAM) such as dynamic RAM (DRAM) or synchronous DRAM (SDRAM). However, it is contemplated that other embodiments may be implemented using other types of suitable memory.

Storage 240 is configured to store instructions and data. Storage 240 may be an example of any type of mass storage device or system. For example, in one embodiment, storage 240 may be implemented as one or more hard disks configured independently or as a disk storage system. In one embodiment, the disk storage system may be an example of a redundant array of inexpensive disks (RAID) system. In an alternative embodiment, the disk storage system may be a disk array, or Just a Bunch Of Disks (JBOD), (used to refer to disks that are not configured according to RAID). In yet other embodiments, storage 240 may include tape drives, optical storage devices or RAM disks, for example.

Network interface 260 may implement functionality to connect server system 102 to a network such as network 108 via network connection 275. For example, network interconnect 260 may include a hardware layer and a software layer which controls the hardware layer. The software may be executable by processor 220 out of memory 230 to implement various network protocols such as TCP/IP and hypertext transport protocol (HTTP), for example.

Figure 4:
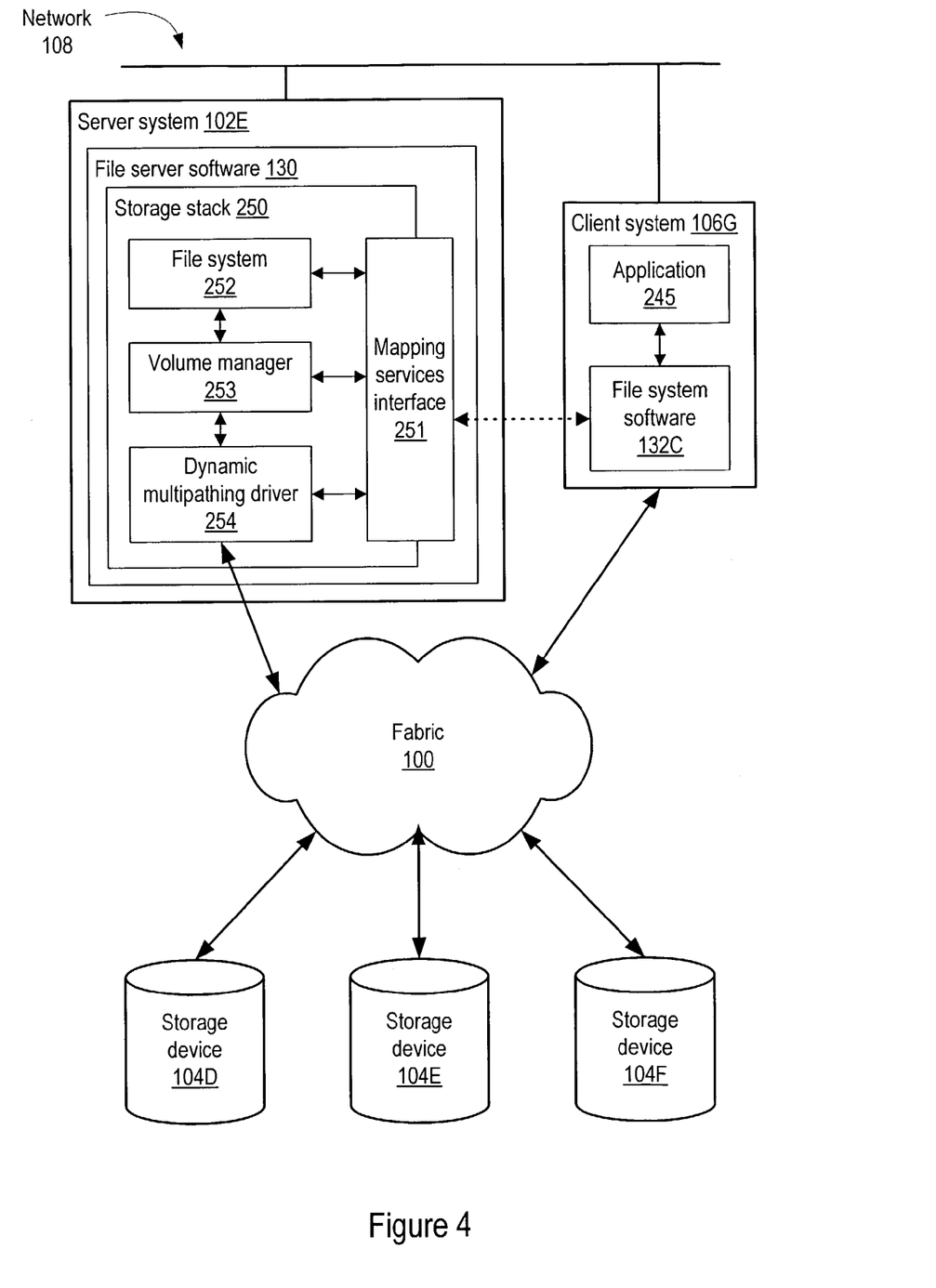
FIG. 4 is a diagram of an exemplary SAN direct access system including a single-node storage stack according to one embodiment.

FIG. 4 is a diagram of an exemplary SAN direct access system including a single-node storage stack 250 according to one embodiment. A server system 102E and a client system 106G may be coupled to each other via a network 108 (e.g., a LAN) and also to a SAN via fabric 100. The server system 102E may "own" or manage one or more files on one or more storage devices 104. The server system 102E may execute file server software 130 to control access to the files it owns.

The file server software 130 may include a single-node storage stack 250. Generally, the storage stack may include file systems, volume managers, device drivers and storage arrays. In one embodiment, as illustrated in FIG. 4, the storage stack 250 may include a file system (including file system manager software) 252, a volume manager 253, and one or more device drivers such as a dynamic multipathing (DMP) driver 254. In various embodiments, the storage stack 250 may include other combinations of components. In one embodiment, the volume manager may abstract the traditional physical limitations of disk storage and permit, for example, a single file to be spread across a plurality of storage devices 104. In one embodiment, DMP support may eliminate a single point of failure by providing multiple I/O paths into the storage 104.

The file system 252, volume manager 253, and dynamic multipathing driver 254 may export a mapping interface 251. In one embodiment, the mapping interface (or mapping services interface) 251 includes a set of shared libraries that offers developers a common set of tools to initiate functions such as qualitative mapping, quantitative mapping, and frozen image generation into SAN-enabled storage management software. The mapping interface 251 may support exposure of the private data (metadata) of data objects (e.g., files) and the configurations of the stack element on which those objects reside, decomposition of logical to physical data mapping of data objects, analysis of possible frozen image methods, and snapshot image generation of data objects. The mapping interface 251 may be used in environments where the data objects are resident across a diverse combination of storage stack elements.

Qualitative mapping may be used to determine the environmental characteristics of a storage object and discover how an object is distributed across storage devices. However, qualitative mapping may not map to absolute block extents. Qualitative mapping may reveal a storage object's physical location down to a level such as the logical unit number (LUN) identifier level on a SCSI bus. The mapping interface 251 may be able to determine what subsequent stack elements need to be traversed at each level of the storage stack. Qualitative mapping may be used to expose the metadata about data objects and reveal component-specific attributes associated with each storage stack element. Performance tuning, storage resource management and hierarchical storage management are examples of applications that could use qualitative mapping to provide support within diverse SAN environments.

In one embodiment, quantitative mapping may be used to decompose storage objects into their absolute storage addresses. Quantitative mapping may function across all elements of the storage stack 250, such as the file system 252, volume manager 253, device driver 254, and disk array 104. The mapping process may work with any combination of stack elements that support the mapping interface 251 (e.g., that are supported by plug-in modules). In one embodiment, the object trees are built through qualitative mapping as a precursor to quantitative mapping. During mapping, configuration IDs may be generated for each physical block extent. These configuration IDs may be later used to verify that the data has not "slipped" between the time the map was generated and the time the subsequent operation on the block map was run.

In one embodiment, frozen image generation may be used to provide a point-in-time view of a storage object that is transactionally consistent with respect to the storage stack 250. Frozen images may be created through either software snapshots, hardware snapshots, or hardware mirrors. Hardware-based frozen images may offer the additional benefit of off-server operations. Standard library calls to the mapping interface 251 may be provided to both quiesce the storage stack and to initiate the frozen image generation via the appropriate plug-in modules that are provided for each storage stack element.

In one embodiment, the mapping interface 251 may be used to examine the local representation of the storage object, determine the best method of quiescing the storage stack, and reveal which options are available for freezing the components of the storage object. This analysis may permit the mapping interface 251 to freeze storage objects with arbitrary compositions in heterogeneous environments.

Figure 5:
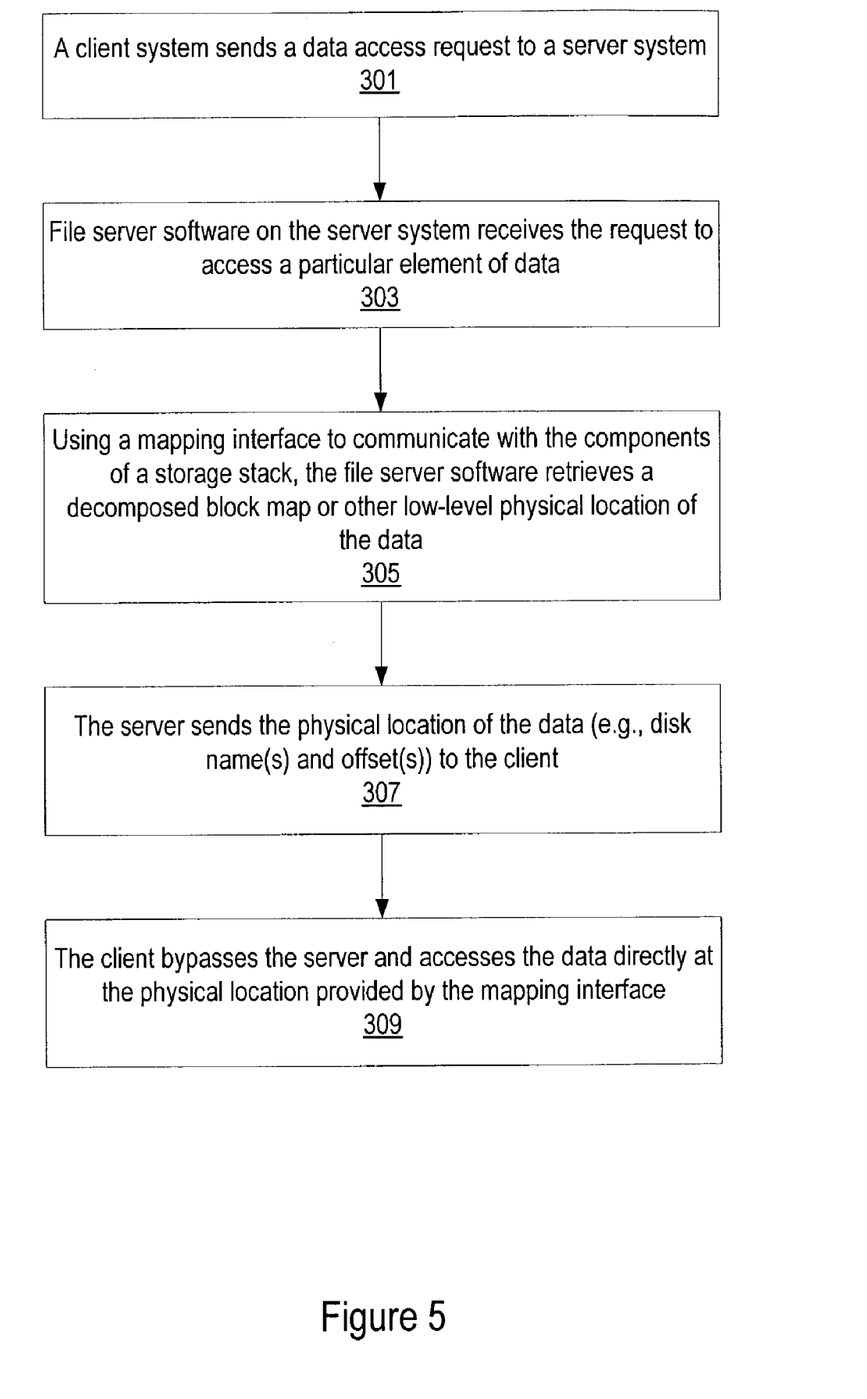
FIG. 5 is a flowchart which illustrates a method for providing direct multi-node file system access to files on a single-node storage stack according to one embodiment.

FIG. 5 is a flowchart which illustrates a method for providing direct multi-node file system access to files on a single-node storage stack according to one embodiment. In 301, the client system 106G may send a data access request to the server system 102E over the network (e.g., LAN) 108. The data access request may comprise a request to access data which is stored on the storage devices 104 and whose access is controlled by the server system 102E. For example, the client system 106G may send the request in response to a request from an application 245 or other element of software to read, write, or perform another I/O function on a data object (e.g., a file) that is managed by the server system 102E. File system software 132C on the client 132C may handle the sending and receiving of data regarding the data access request and any responses from the server system 102E. In one embodiment, the data access request may include a file identifier such as a file name or file ID number which indicates the desired file.

In one embodiment, the various components of the storage stack 250 may implement the mapping interface 251. In other words, the components of the storage stack may export the mapping interface 251 such that external software components are able to communicate with the file server software 130 using standard functions or commands. The external software components may include heterogeneous applications and system software on other computer systems such as the client 106G. In one embodiment, components of the storage stack 250 (e.g., file systems, volume managers, device drivers and storage arrays) may be supported by lightweight plug-in modules. These modules, which may be implemented as additional shared libraries in the mapping interface 251, may link the features of a storage stack element to an appropriate function call of the mapping interface.

In 303, the file server software 130 may receive the data access request from the client system 106G.

In 305, the file server software may use the mapping interface 251 to retrieve a physical location of the data on the one or more storage devices. In one embodiment, a function call of the mapping interface 251 may be used to determine how many components reside in the storage stack 250. The mapping interface 251 may then be used to communicate with the components of the storage stack 250, from the highest-level component to the lowest-level component, to decompose a block map of the data into a low-level physical location of the data. The physical location may include the disk name(s) and appropriate offsets where the desired data resides on the storage device(s) 104.

For example, in the embodiment illustrated in FIG. 4, the storage stack may include a file system 252, a volume manager 253, and one or more device drivers 254. In one embodiment, the data access request may be input to the mapping interface 251, and appropriate function call of the mapping interface 251 may communicate with the file system 252 to return a logical location of the data. In various embodiments, the logical location may include a path name, a partition, an inode, etc. The logical location may be input to an appropriate function call in the mapping interface 251 to communicate with the volume manager 253. The volume manager 253 may return a block map. The block map may be input to an appropriate function call in the mapping interface 251 to communicate with the device driver(s) 254, which may then return the low-level physical location of the data.

In 307, the file server software 130 may send the physical location of the data to the client system (e.g., the file system client software 132C). Due to the levels of abstraction provided by the mapping interface 251, the client system 106G may request complex data objects such as files which are stored across two or more of the storage devices 104. As a further example, the storage devices 104 may be configured as a RAID Level 5 with byte-level data striping, and the data requested by the client system 106G may be striped. As yet another example, the storage devices 104 may be configured to use data mirroring, and the data requested by the client system 106G may be mirrored.

In 309, the client system 132C may bypass the server system 102E to access the data on the one or more storage devices at the physical location provided by the mapping interface 251. By accessing the data directly over the storage area network, the client 106G may experience improved speed and performance.

Use of the mapping interface 251 may confer numerous benefits for a SAN-enabled storage management system. Applications may work across heterogeneous combinations of storage stack elements which are supported by plug-in modules for the mapping interface 251. As plug-in modules for new products are developed, existing applications may be immediately compatible with them. File metadata, absolute physical block addresses, and configuration attributes of storage stack elements may be exposed for applications such as performance management and virtualization. Hardware and software frozen images may be generated for server and third-party copying, decision support, and data mining. Using documented libraries for the mapping interface 251, developers may speed application development by abstracting the data storage stack from data mapping and snapshot generation processes.

It is noted that the steps described above in conjunction with the descriptions of FIG. 5 are numbered for discussion purposes only and that the steps may numbered differently in alternative embodiments.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method comprising:
   sending a data access request from a first computer system to a second computer system, wherein the second computer system is operable to control access to one or more storage devices, wherein the second computer system comprises a storage stack comprising components for managing the one or more storage devices, and wherein the data access request comprises a request to access data which is stored on the one or more storage devices;
   using a mapping interface on the second computer system to determine a quantity of components in the storage stack;
   using the mapping interface on the second computer system to communicate with the components in the storage stack to retrieve a physical location of the data on the one or more storage devices;
   sending the physical location from the second computer system to the first computer system; and
   the first computer system bypassing the second computer system to access the data on the one or more storage devices at the physical location.

2. The method of claim 1,
   wherein using the mapping interface on the second computer system to retrieve the physical location comprises:
   inputting the data access request to the mapping interface to retrieve a logical location of the data from a file system on the second computer system;
   inputting the logical location to the mapping interface to retrieve a block map from a volume manager on the second computer system; and
   inputting the block map to the mapping interface to retrieve the physical location of the data from one or more device drivers on the second computer system.

3. The method of claim 1,
   wherein using the mapping interface on the second computer system to retrieve the physical location comprises:
   inputting the data access request to the mapping interface to retrieve a logical location of the data; and
   inputting the logical location to the mapping interface to retrieve the physical location of the data from one or more device drivers for the one or more storage devices.

4. The method of claim 1,
   wherein the storage stack on the second computer system comprises a single-node storage stack.

5. The method of claim 1,
   wherein the data comprises a file which is stored across two or more of the storage devices.

6. The method of claim 1,
   wherein, in sending the data access request to the second computer system, the first computer system is operable to send the data access request over a first network;

wherein, in accessing the data on the one or more storage devices at the physical location, the first computer system is operable to access the data over a second network.

7. The method of claim 1,
wherein the one or more storage devices are configured as a RAID with byte-level data striping, and wherein the data accessed by the first computer system is striped.

8. The method of claim 1,
wherein the one or more storage devices are configured to use data mirroring, and wherein the data accessed by the first computer system is mirrored.

9. A computer-readable storage medium comprising program instructions, wherein the program instructions are computer-executable to implement:
receiving a data access request at a second computer system from a first computer system, wherein the second computer system is operable to control access to one or more storage devices on a storage area network, wherein the second computer system comprises a storage stack comprising components for managing the one or more storage devices, and wherein the data access request comprises a request to access data which is stored on the one or more storage devices;
using a mapping interface on the second computer system to determine a quantity of components in the storage stack;
using the mapping interface on the second computer system to communicate with the components in the storage stack to retrieve a physical location of the data on the one or more storage devices;
sending the physical location from the second computer system to the first computer system; and
wherein the first computer system is operable to bypass the second computer system to access the data on the one or more storage devices at the physical location.

10. The computer-readable storage medium of claim 9,
wherein using the mapping interface on the second computer system to retrieve the physical location comprises:
inputting the data access request to the mapping interface to retrieve a logical location of the data from a file system on the second computer system;
inputting the logical location to the mapping interface to retrieve a block map from a volume manager on the second computer system; and
inputting the block map to the mapping interface to retrieve the physical location of the data from one or more device drivers on the second computer system.

11. The computer-readable storage medium of claim 9,
wherein using the mapping interface on the second computer system to retrieve the physical location comprises:
inputting the data access request to the mapping interface to retrieve a logical location of the data; and
inputting the logical location to the mapping interface to retrieve the physical location of the data from one or more device drivers for the one or more storage devices.

12. The computer-readable storage medium of claim 9,
wherein the data comprises a file which is stored across two or more of the storage devices.

13. The computer-readable storage medium of claim 9,
wherein the one or more storage devices are configured as a RAID with byte-level data striping, and wherein the data accessed by the first computer system is striped.

14. A system, comprising:
a processor;
one or more storage devices;
a storage stack comprising components for managing the one or more storage devices; and
a memory comprising program instructions, wherein the program instructions are executable by the processor to:
control access to the one or more storage devices;
receive a data access request from a client computer system, wherein the data access request comprises a request to access data which is stored on the one or more storage devices;
use a mapping interface to determine a quantity of components in the storage stack;
use the mapping interface to communicate with the components in the storage stack to retrieve a physical location of the data on the one or more storage devices;
send the physical location to the client computer system; and
wherein the client computer system is operable to bypass the processor to access the data on the one or more storage devices at the physical location.

15. The system of claim 14,
wherein, to use the mapping interface to retrieve the physical location, the program instructions are executable by the processor to:
input the data access request to the mapping interface to retrieve a logical location of the data from a file system;
input the logical location to the mapping interface to retrieve a block map from a volume manager; and
input the block map to the mapping interface to retrieve the physical location of the data from one or more device drivers for the one or more storage devices.

16. The system of claim 14,
wherein, to use the mapping interface to retrieve the physical location, the program instructions are executable by the processor to:
input the data access request to the mapping interface to retrieve a logical location of the data; and
input the logical location to the mapping interface to retrieve the physical location of the data from one or more device drivers for the one or more storage devices.

17. The system of claim 14,
wherein the data comprises a file which is stored across two or more of the storage devices.

18. The system of claim 14,
wherein the one or more storage devices are configured as a RAID with byte-level data striping, and wherein the data accessed by the client computer system is striped.

19. A system comprising:
means for sending a data access request from a first computer system to a second computer system, wherein the second computer system is operable to control access to one or more storage devices, wherein the second computer system comprises a storage stack comprising components for managing the one or more storage devices, and wherein the data access request comprises a request to access data which is stored on the one or more storage devices;

means for using a mapping interface on the second computer system to determine a quantity of components in the storage stack;

means for using the mapping interface on the second computer system to communicate with the components in the storage stack to retrieve a physical location of the data on the one or more storage devices;

means for sending the physical location from the second computer system to the first computer system; and wherein the first computer system is operable to bypass the second computer system to access the data on the one or more storage devices at the physical location.

20. The system of claim 19, wherein the means for using the mapping interface on the second computer system to retrieve the physical location comprise:

means for inputting the data access request to the mapping interface to retrieve a logical location of the data; and means for inputting the logical location to the mapping interface to retrieve the physical location of the data from one or more device drivers for the one or more storage devices.

\* \* \* \* \*